(12) United States Patent
Herzberg

(10) Patent No.: US 9,046,018 B2
(45) Date of Patent: Jun. 2, 2015

(54) CONSTRUCTION MACHINE WITH HEAT MANAGEMENT SYSTEM

(71) Applicant: JOSEPH VOEGELE AG, Ludwigshafen/Rhein (DE)

(72) Inventor: Ingo Herzberg, Angelbachtal (DE)

(73) Assignee: JOSEPH VOEGELE AG (DE)

( * ) Notice: Subject to any disclaimer, the term of this patent is extended or adjusted under 35 U.S.C. 154(b) by 0 days.

(21) Appl. No.: 14/081,142

(22) Filed: Nov. 15, 2013

(65) Prior Publication Data
US 2014/0199212 A1    Jul. 17, 2014

(30) Foreign Application Priority Data

Jan. 11, 2013   (EP) ..................................... 13000147

(51) Int. Cl.
*F01N 3/24* (2006.01)
*F01N 3/08* (2006.01)
*E02F 9/08* (2006.01)
(Continued)

(52) U.S. Cl.
CPC ........ *F01N 3/0842* (2013.01); *F01N 2900/1811* (2013.01); *F01N 2610/1486* (2013.01); *F01N 2610/1473* (2013.01); *F01N 2610/105* (2013.01); *E02F 9/0883* (2013.01); *F01N 3/2066* (2013.01); *F01N 13/14* (2013.01); *F01N 2590/08* (2013.01); *F01N 2610/02* (2013.01); *F01N 2610/10* (2013.01);
(Continued)

(58) Field of Classification Search
CPC .......... F01N 2610/105; F01N 2610/11; F01N 2610/1406; F01N 2610/1473; F01N 2610/1486; F01N 2900/1811

USPC ............................ 60/286, 295, 298, 301, 320
See application file for complete search history.

(56) References Cited

U.S. PATENT DOCUMENTS 6,063,350 A * 5/2000 Tarabulski et al. ......... 423/239.1
7,266,967 B2  9/2007 Inoue et al.
(Continued)

FOREIGN PATENT DOCUMENTS

DE    102010029269 A1   12/2011
EP         1582732 A1   10/2005
(Continued)

OTHER PUBLICATIONS

European Search Report Dated May 27, 2013, Application No. 13000147.2-1603, Applicant Joseph Voegele AG, 6 Pages.
(Continued)

*Primary Examiner* — Thomas Denion
*Assistant Examiner* — Jorge Leon, Jr.
(74) *Attorney, Agent, or Firm* — Brooks Kushman P.C.

(57) ABSTRACT

A construction machine according to the disclosure includes a tank for receiving an additive provided for the treatment of exhaust gases of the construction machine, and the additive has a decomposition temperature. The construction machine furthermore comprises at least one connecting line which is configured to conduct the additive away from the tank and/or to the tank. A withdrawal unit is connected to the at least one connecting line and is configured to transport the additive from the tank to the at least one connecting line and/or from the at least one connecting line into the tank. The construction machine further comprises a heat management system configured to influence temperature of the additive in the tank such that it does not exceed the decomposition temperature of the additive.

16 Claims, 9 Drawing Sheets

(51) Int. Cl.
*F01N 3/20* (2006.01)
*F01N 13/14* (2010.01)
*E02F 9/20* (2006.01)

(52) U.S. Cl.
CPC .... *F01N 2610/11* (2013.01); *F01N 2610/1406* (2013.01); *E02F 9/2066* (2013.01); *Y02T 10/24* (2013.01)

(56) References Cited

U.S. PATENT DOCUMENTS

| | | |
|---|---|---|
| 7,647,767 B2 | 1/2010 | Osaku et al. |
| 8,276,370 B2 | 10/2012 | Kamiya et al. |
| 2004/0128989 A1* | 7/2004 | Watanabe et al. ............... 60/298 |
| 2007/0180816 A1* | 8/2007 | Masuda et al. .................. 60/274 |
| 2009/0084095 A1* | 4/2009 | Dalton ............................ 60/301 |
| 2009/0126349 A1* | 5/2009 | Shimomura et al. ............ 60/286 |
| 2009/0282813 A1* | 11/2009 | Kopinsky ........................ 60/286 |
| 2010/0038162 A1 | 2/2010 | Kamiya et al. |
| 2010/0205948 A1* | 8/2010 | Bauer et al. .................... 60/303 |
| 2010/0212297 A1* | 8/2010 | Kamiya et al. ................. 60/286 |
| 2010/0266458 A1* | 10/2010 | Takeshita et al. ............. 422/109 |
| 2010/0319321 A1* | 12/2010 | Kamiya et al. ................. 60/285 |
| 2011/0011064 A1* | 1/2011 | Kamiya et al. ................. 60/295 |
| 2012/0186894 A1* | 7/2012 | Schmidt et al. ............... 180/309 |
| 2013/0276922 A1* | 10/2013 | Kobayashi et al. ...... 137/565.01 |

FOREIGN PATENT DOCUMENTS

| | | |
|---|---|---|
| EP | 1662103 A1 | 5/2006 |
| EP | 2103788 A2 | 9/2009 |
| JP | 2004284432 A | 10/2004 |
| JP | 2005083223 A | 3/2005 |
| JP | 2005212735 A | 8/2005 |
| JP | 2005273509 A | 10/2005 |
| JP | 2007040592 A | 2/2007 |
| JP | 2008297981 A | 12/2008 |
| JP | 2008303786 A | 12/2008 |
| JP | 2009002261 A | 1/2009 |
| JP | 2009127473 A | 6/2009 |
| JP | 2010138849 A | 6/2010 |

OTHER PUBLICATIONS

Japanese Office Action Dated Dec. 2, 2014, Application No. 2013-219007, Dispatch No. 61644, 4 Pages.

* cited by examiner

CONSTRUCTION MACHINE WITH HEAT MANAGEMENT SYSTEM

CROSS-REFERENCE TO RELATED APPLICATIONS

This application claims foreign priority benefits under 35 U.S.C. §119(a)-(d) to European patent application number EP 13000147.2, filed Jan. 11, 2013, which is incorporated by reference in its entirety.

TECHNICAL FIELD

The disclosure relates to a construction machine configured to treat exhaust gases with an additive.

BACKGROUND

Such construction machines are known from practice. They normally have a primary drive which emits exhaust gases. Due to anti-pollution guidelines and laws becoming stricter, subsequent treatment measures which reduce harmful or undesired ingredients of the exhaust gases are increasingly required. One possible measure is to inject additives into the exhaust stream. By various chemical reactions, the undesired ingredients of the exhaust gases are converted into less harmful substances. One example of this is the injection of urea solutions into the exhaust gases of diesel engines to reduce the emission of various nitrogen oxides.

SUMMARY

It is an object of the disclosure to expand the field of application of construction machines with exhaust treatment systems.

A construction machine according to the disclosure is characterized by a heat management system which is designed to influence the temperature of an additive in a tank such that it does not exceed a decomposition temperature of the additive. Depending on the place where the construction machine is employed, active or passive systems can be used.

It is particularly advantageous for the heat management system to be configured to influence the temperature of the additive in the tank such that it does not exceed 50° C. This is relevant in particular for the widely spread use of urea solutions as such solutions decompose within these temperature ranges and thus become unusable.

It is suitable for the tank in which the additive is located to be enclosed by an insulating housing. This constitutes an inexpensive and simple solution for less hot regions. The tank can thus be protected in particular from radiant heat, or in cases where the admissible temperature is only temporarily exceeded in the surroundings of the tank.

It may be advantageous for the insulating housing to include channels through which a medium can flow. In this manner, heat may be dissipated actively by convection. The medium may be, for example, ambient air.

It is conceivable to arrange a heat transfer unit in the insulating housing which is configured, together with a compressor, to supply and/or withdraw thermal energy to/from the tank and/or its contents. Such a solution is in particular advantageous if e.g., ambient air has a very high temperature.

In a further variant, the heat management system may comprise control lines which are connected to a withdrawal unit disposed in the tank and which are configured to supply the withdrawal unit with a heating medium, the withdrawal unit being configured to selectively withdraw and/or supply thermal energy from and/or to the tank using the heating medium. In this manner, the temperature of the additive in the tank may be regulated directly. Possible conduction losses through the wall of the tank are thus avoided. Since the control lines are connected to the withdrawal unit, an extra opening may be eliminated in an optionally employed insulating housing because the control lines may exit through the same opening of the insulating housing as connecting lines connected to the withdrawal unit for transporting the additive.

It is suitable for the heating medium to be a cooling medium of a cooling system of a primary drive of the construction machine. Thus, one only has to expand a cooling circuit which is already required instead of providing an additional one. This helps to reduce the costs and efforts required for the heat management system.

In a further variant, the control line may be connected with a hot and/or a cold side of a chiller. In this manner, the heat management system may even cope with high refrigerating capacity requirements in especially hot regions.

It is conceivable for the heat management system to furthermore comprise a control device which is configured to selectively connect the control line with the hot or the cold side of the chiller. This variant is particularly suited for locations exhibiting high temperature differences. There, it may be advantageous to only temporarily cool the additive in the tank, but to heat it at other times. In particular, however, in construction machines which are employed at various sites exhibiting high temperature differences, such a solution is advantageous.

It is particularly advantageous for the chiller to use the thermal energy of a cooling medium of a primary drive of the construction machine for producing cold. This permits a particularly energy efficient operation of the construction machine.

It is conceivable that the chiller is an adsorption chiller.

In one variant, in which at least one return line is provided as a connecting line, wherein the return line supplies additives to the tank, it is advantageous to dispose a cooling device in the region of the return line which is configured to withdraw thermal energy from the additive passed through the return line. Thereby, the heat introduction by the returning, possibly heated additive into the tank is reduced. Even if the additive flowing through the return line is not warmer than the additive located in the tank, it may be suitable to cool the returning additive. In this manner, the contents of the tank are additionally cooled.

Here, the cooling device may be e.g., a Peltier element.

In a further variant, the cooling device may be a second heat transfer unit which is disposed in the region of a cooling unit of a primary drive of the construction machine. By utilizing existing machine components, here, too, the costs and efforts required for the heat management system may be reduced.

The construction machine may be e.g., a road finishing machine or a feeder.

The disclosure also relates to a construction machine, for example a road finishing machine or a feeder, of the type described above.

Below, advantageous embodiments according to the disclosure will be illustrated by way of example with reference to the attached drawings.

DETAILED DESCRIPTION

Figure 1:
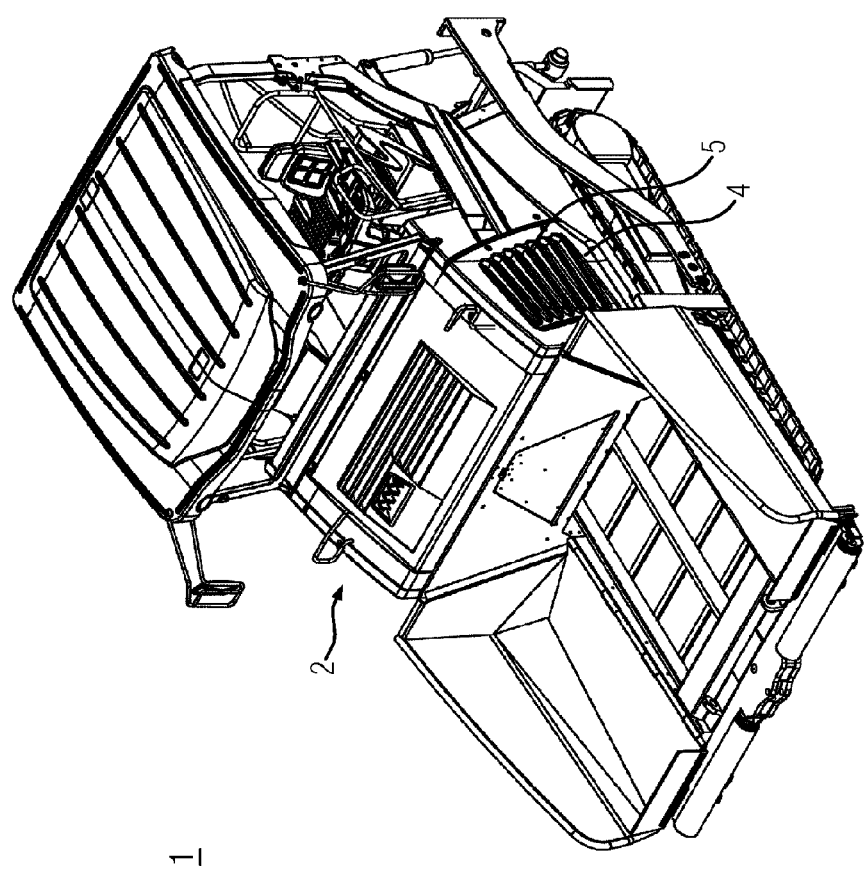
FIG. 1 shows a road finishing machine as an example of a construction machine.

FIG. 1 shows a perspective view of a construction machine 1, in this embodiment a road finishing machine. An engine room 2 is provided at the construction machine 1 in which a primary drive 3 as well as further components and additional units of the construction machine 1 are arranged. In the shown embodiment, a cooling unit 6 of the primary drive 3 of the construction machine 1 which carries a cooling medium 33 is located behind a cover 4 of the engine room in which louvers 5 are provided.

Figure 2:
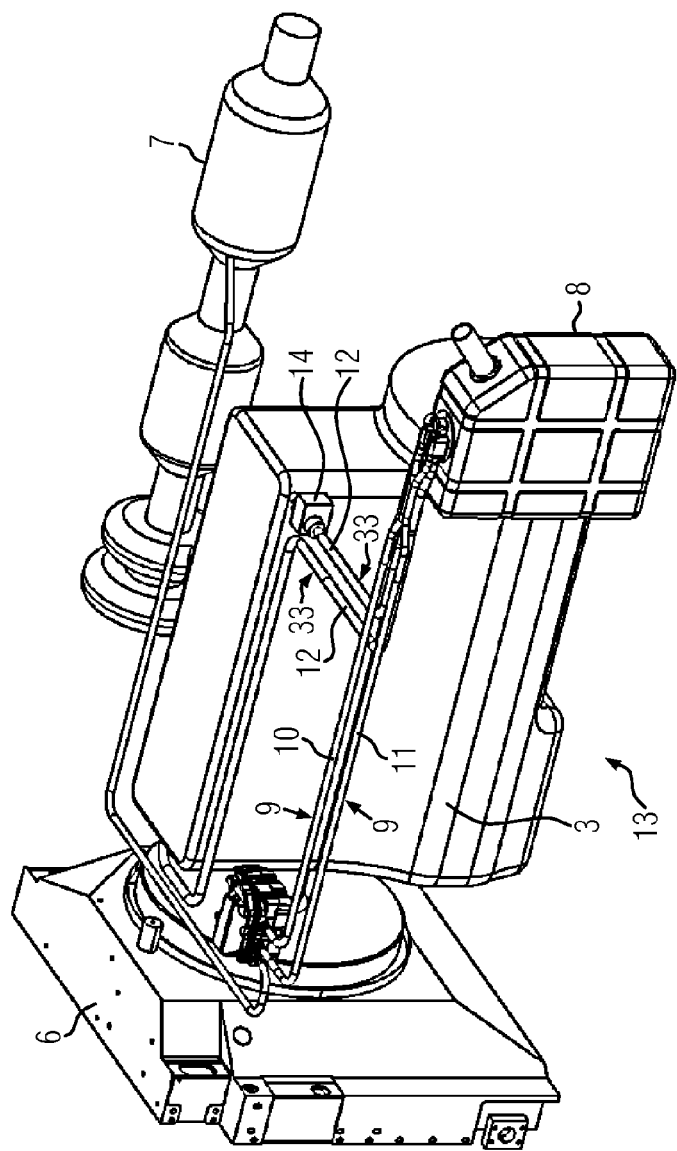
FIG. 2 shows a primary drive of the construction machine of FIG. 1, a cooling unit for cooling this primary drive, an exhaust gas unit for removing the exhaust gases of the primary drive, a tank for receiving an additive for the treatment of exhaust gases, and a heat management system.

In FIG. 2, the primary drive 3 and the cooling unit 6 are represented. Moreover, an exhaust gas section 7 is represented which may be configured to remove exhaust gases of the primary drive 3. However, it is also conceivable that exhaust gases of further components of the construction machine 1 are removed via the exhaust gas section 7. Furthermore, a tank 8 is shown which is configured to receive an additive 9. To this end, it is connected to the exhaust gas section 7 by at least one connecting line 10. In the represented embodiment, a return line 11 is provided as a further connecting line 10 which returns the additive 9 that is not required to the tank 8. The tank 8 is moreover connected to a cooling circuit of the primary drive 3 by means of control lines 12, so that hot cooling medium 33 may be transported into the region of the tank 8. This may be advantageous for heating the additive 9 to its operating temperature. The control lines 12 do not necessarily have to be connected to the cooling circuit of the primary drive 3. They may be connected with any device of the construction machine 1 which is suited for supplying the control lines 12 with a heating medium 17 that can be employed for controlling the temperature of the additive 9.

In addition, a first embodiment of a heat management system 13 is shown which in this embodiment comprises the control lines 12 and a shut-off valve 14 which interrupts the supply of hot cooling medium 33 as soon as the temperature of the additive 9 exceeds a certain preset temperature. This temperature may be a decomposition temperature of the additive. However, it is more advantageous for the preset temperature to be lower than the decomposition temperature of the additive 9, for example 1-20° C. below the decomposition temperature, preferably 1-10° C. below the decomposition temperature of the additive 9, particularly preferred 1-5° C. below the decomposition temperature of the additive 9. The indicated temperature ranges are applicable to all described embodiments and also to embodiments which combine the various features of the described embodiments in any way.

As an additive, a urea solution may be used, for example. This is particularly suited for reducing the emission of undesired nitrogen oxides. In this case, the heat management system 13 is designed to maintain the temperature of the additive 9 at any time at below 50° C., preferably below 45° C.

Figure 3:
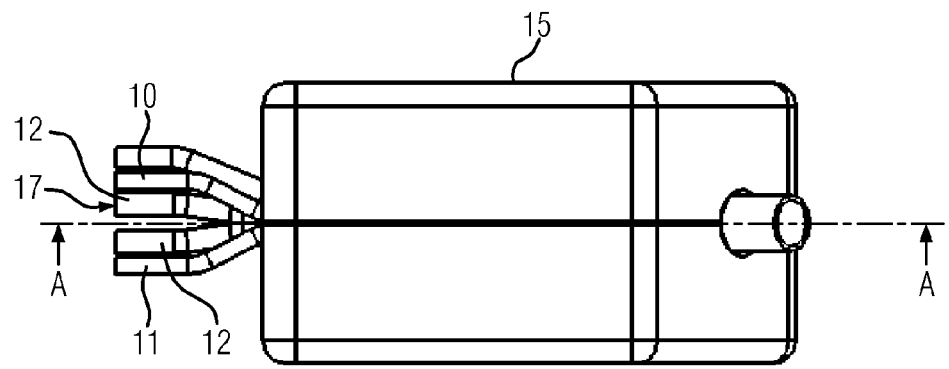
FIG. 3 shows a plan view of an additive tank enclosed by an insulating housing.

FIG. 3 shows the tank 8 according to a second embodiment of the disclosure. Here, the tank 8 is enclosed by an insulating housing 15. The insulating housing 15 may, as a part of the heat management system 13, contribute to maintaining the temperature of the additive 9 within the desired range. It may in particular provide protection from radiant heat which is emitted e.g., by the primary drive 3 of the construction machine 1. In this and in the following representations, the insulating housing 15 is shown as comprising two half shells and being made of solid material. However, it is equally possible to provide hollow bodies, double walls or other structures in or at the insulating housing 15 which are suited for insulating its contents from sources of heat in the surrounding area. It is moreover possible to design the insulating housing 15 so as to comprise more or less than two elements.

Figure 4:
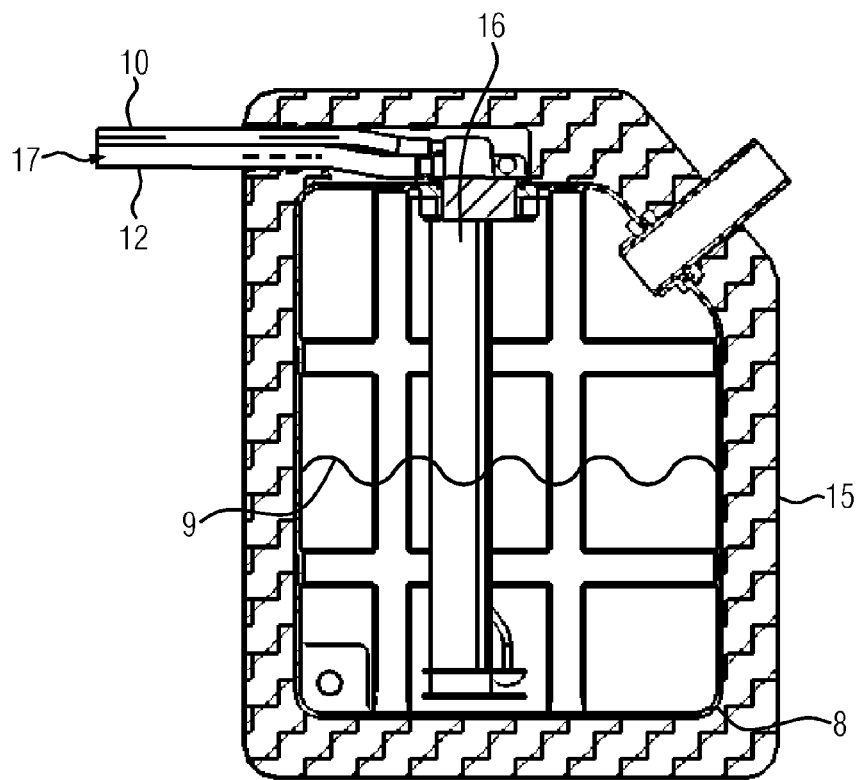
FIG. 4 shows a lateral sectional view of the tank of FIG. 3.

FIG. 4 shows a sectional view of the tank 8 and the insulating housing 15 enclosing it. A withdrawal unit 16 is arranged in the tank 8. The latter is designed to transport the additive 9 from the tank 8 to the connecting lines 10 and/or to transport the additive 9 from the return line 11 into the tank 8. In the shown embodiment, the withdrawal unit 16 is moreover connected to the control lines 12. In this case, it may be designed such that a heating medium circulating through the control lines 12 is passed through the withdrawal unit 16 in such a way that it absorbs heat from the additive 9 in the tank 8 or emits thereto. Depending on the temperature of the heating medium 17, it is thus possible to heat the additive 9 when the construction machine 1 is employed in a cold surrounding area, and/or to cool the additive 9 when the construction machine 1 is employed in a hot region.

Figure 5:
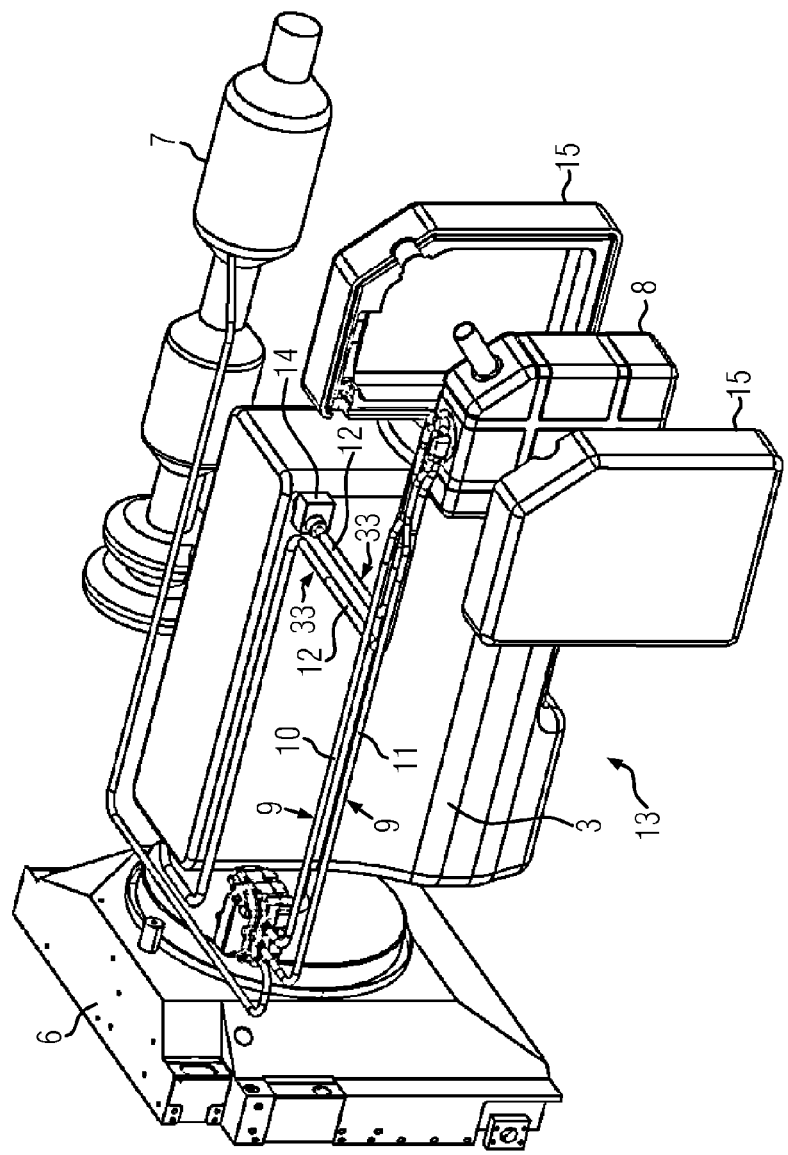
FIG. 5 shows the same components as FIG. 2 and, in addition, an insulating housing for the additive tank.

FIG. 5 shows various components of the construction machine 1 according to the second embodiment of the disclosure. The primary drive 3, its cooling unit 6, the exhaust gas section 7, and the tank 8 for receiving the additive 9 are shown. The tank 8 is enclosed by the two halves of the insulating housing 15 and is thus protected from heat emitted by the primary drive 3. In the shown embodiment, the control lines 12 only lead the cooling medium 33 as heating medium 17 out of the cooling circuit of the primary drive 3. Since this medium is normally rather warm, no active cooling by the withdrawal unit 16 is possible in the shown configuration. As already mentioned, however, with the aid of the shut-off valve 14, the supply of heating medium 17 to the withdrawal unit 16 may be interrupted, thus stopping the heat introduction into the tank 8. As will be illustrated in embodiments described below, however, even an active cooling of the contents of the tank 8 may be realized using the control lines 12 and the withdrawal unit 16.

Figure 6:
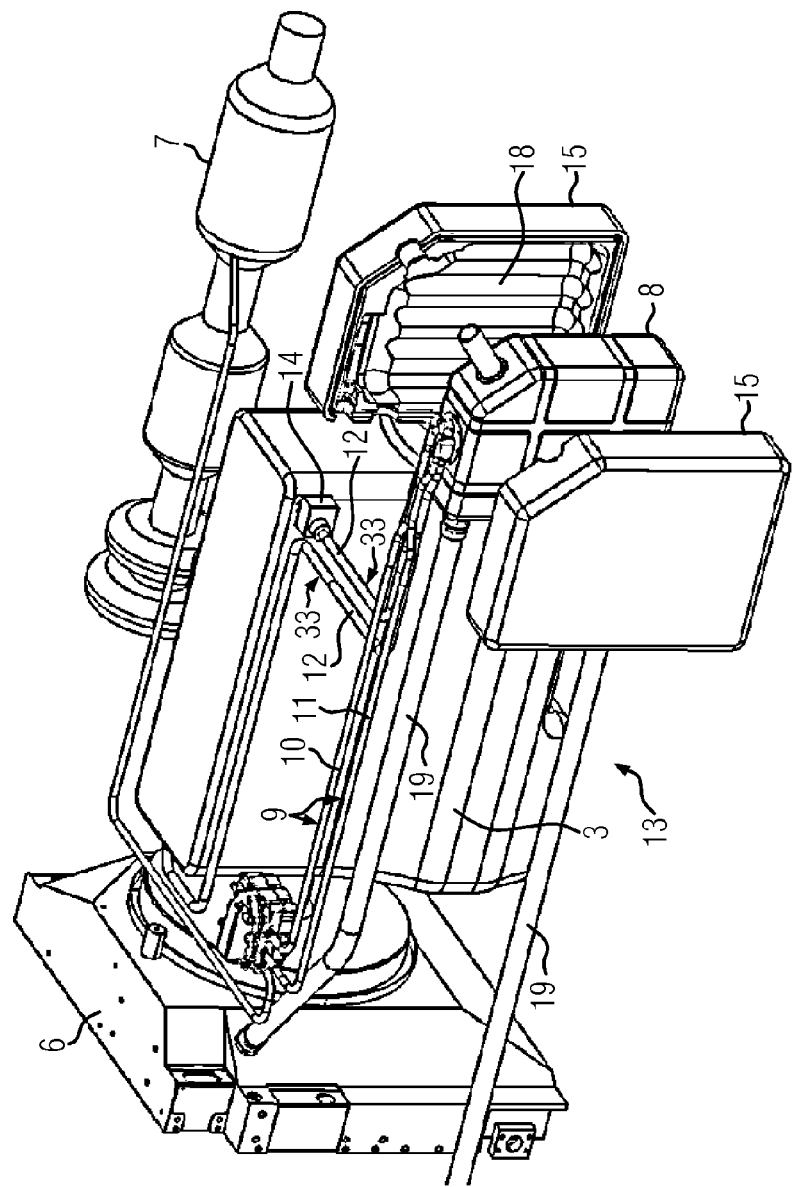
FIG. 6 shows the components of FIG. 5 with a heat management system according to a further embodiment of the disclosure.

In FIG. 6, components of the construction machine 1 according to a third embodiment are shown. In contrast to the above described second embodiment, channels 18 are provided in the insulating housing 15 through which a medium can flow. Thus, the heat dissipation out of the insulating housing 15 and away from the tank 8 may be increased. As a medium, any liquids or gases may be used. In the present embodiment, ambient air is used which is conducted from ventilation lines 19 to the insulating housing 15 and away from it, respectively. In the embodiment, the pressure difference required for this is produced by the cooling unit 6. However, it may also be provided by using any other kind of devices, e.g., fans or pumps.

Figure 7:
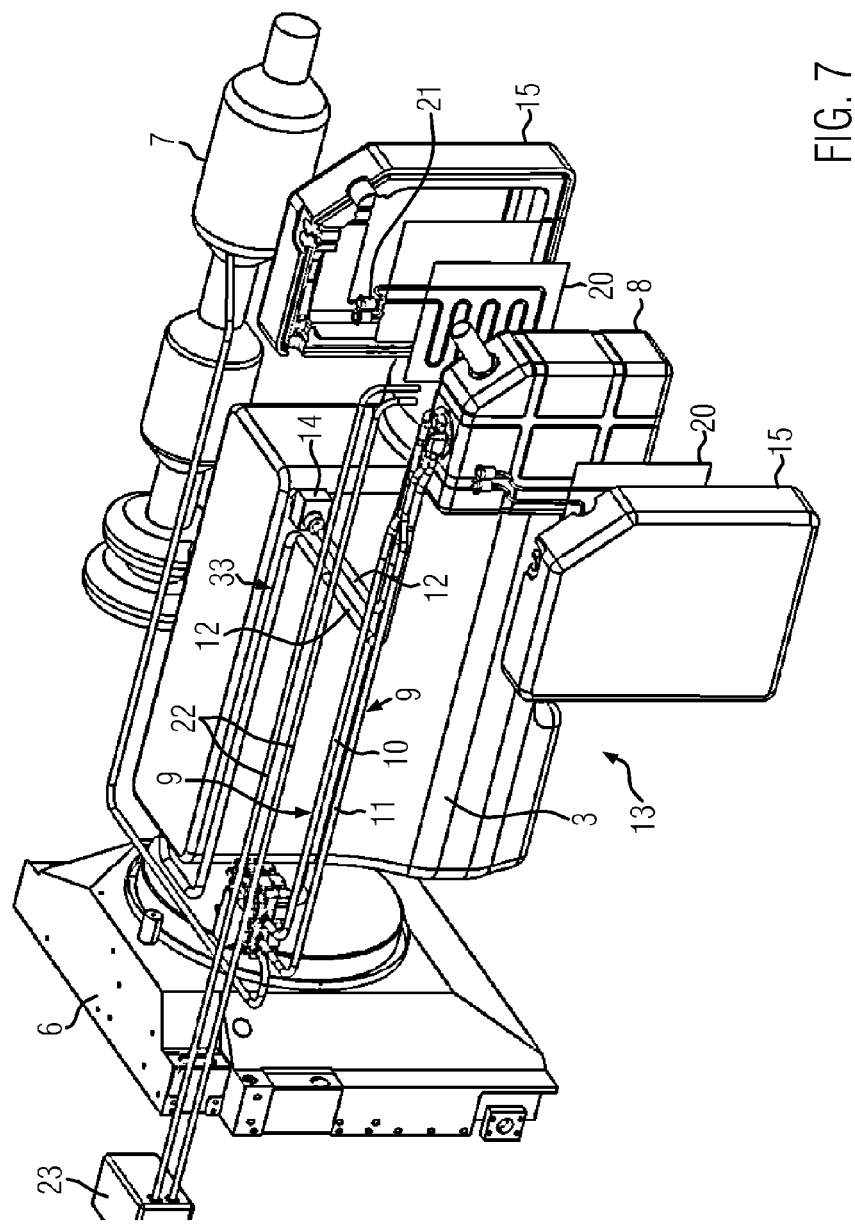
FIG. 7 shows the components of FIG. 5 with a heat management system according to a further embodiment of the disclosure.

In FIG. 7, components of the construction machine 1 according to a fourth embodiment of the disclosure are shown. In this embodiment, the heat management system 13 comprises heat transfer units 20 which are disposed in the region of the tank 8. In the shown embodiment, the heat transfer units 20 are positioned within the insulating housing 15. If no insulating housing 15 is provided, heat transfer units 20 may nevertheless be provided in the region of the tank 8. The heat transfer units 20 are connected to a compressor unit 23 by compressor connections 21 and compressor lines 22. Thereby, one can supply thermal energy to or withdraw thermal energy from the tank 8 using the heat transfer units 20 in a known manner. It is moreover possible to configure the compressor unit 23 such that one can optionally select between a mode in which heat is supplied to the tank 8, and another mode in which thermal energy is withdrawn from the tank 8. This in particular offers advantages when the described construction machine 1 should be ready for use under different climatic conditions. As an alternative to the two heat transfer units 20 shown in the embodiment, only one or an arbitrary number of heat transfer units 20 may also be provided.

Figure 8:
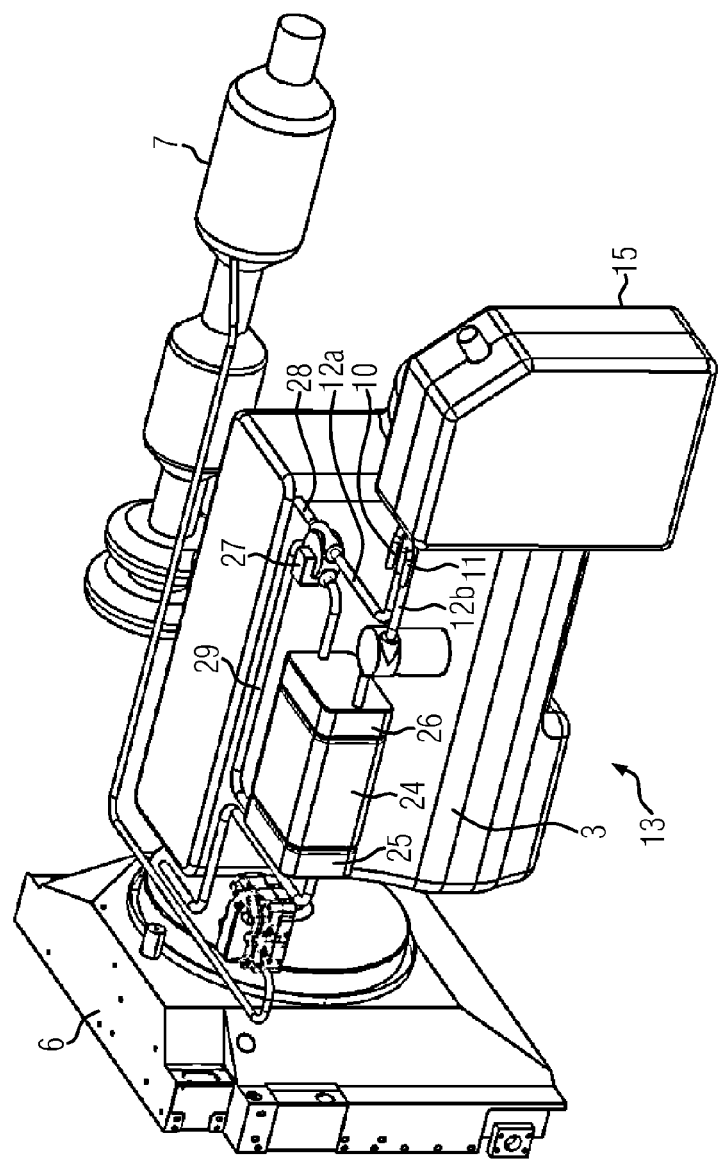
FIG. 8 shows the components of FIG. 5 with a heat management system according to a further embodiment of the disclosure.

FIG. 8 shows different components of the construction machine 1 according to a fifth embodiment of the disclosure. The connecting line 10 and the return line 11 are only shown to some extent for a better overview. In this embodiment, the heat management system 13 comprises a chiller 24. The latter comprises a hot side 25 and a cold side 26. The heat management system 13 furthermore comprises a control device 27 which permits at least two operating modes. In a first operating mode, the control device 27 establishes the connection between the control line 12a and a cooling medium line 28, so that hot cooling medium 33 is transported from the primary drive 3 to the withdrawal unit 16. The latter emits the heat of the heating medium 17, in this case the cooling medium 33 of the primary drive 3, to the additive 9 inside the tank 8. The heating medium 17 is then conducted via the control line 12b and the cold side 26 of the chiller 24 again to the control unit 27 which in the described first operating mode establishes the connection to a line 29 which conducts the heating medium 17 to the hot side 25 of the chiller 24 from where it is finally returned to the cooling circuit of the primary drive 3.

In a second operating mode, the control device 27 establishes a connection between the cooling medium line 28 and the line 29. Thereby, hot cooling medium 33 of the primary drive 3 is conducted to the hot side 25 of the chiller 24. Thereby, the chiller 24 may act on its cold side 26 so as to cool the heating medium 17 conducted therethrough. The latter is conducted from the cold side 26 to the control device 27. The latter establishes a connection to the control line 12a which conducts the cooled heating medium 17 to the withdrawal unit 16 where it may withdraw thermal energy from the additive 9 in the tank 8 and may then flow via the line 12b back to the cold side 26 of the chiller 24. Since the thermal energy of the cooling medium 33 of the primary drive 3 is used here for cooling the heating medium 17, this represents a particularly efficient way of cooling for the additive 9.

Figure 9:
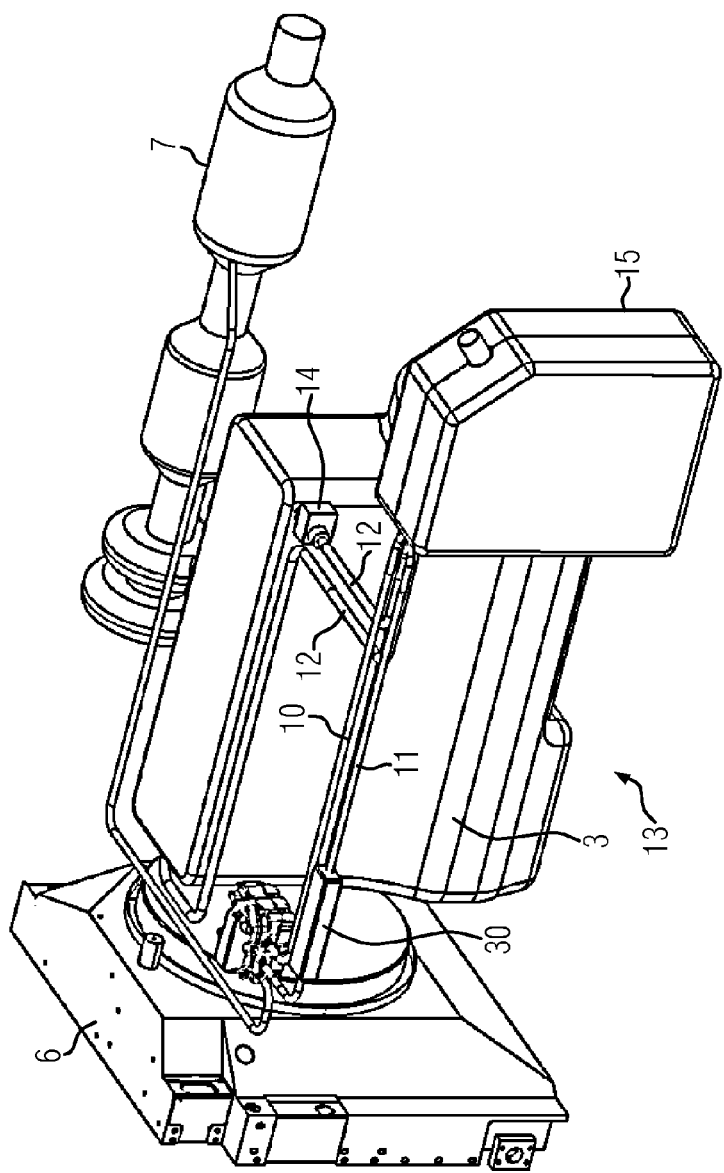
FIG. 9 shows the components of FIG. 5 with a heat management system according to a further embodiment of the disclosure.

In FIG. 9, components of the construction machine 1 according to a sixth embodiment of the disclosure are shown. The heat management system 13 in this embodiment comprises a Peltier element 30 disposed in the region of the return line 11 to cool the additive 9 which is returned to the tank 8 and which is possibly warmer than the additive 9 located in the tank 8. In this manner, any unnecessary introduction of heat into the tank 8 is avoided. Even if the additive 9 flowing through the return line is not warmer than the additive located in the tank 8, it may be suitable for cooling the returning additive 9. In this manner, the contents of the tank 8 are additionally cooled.

Figure 10:
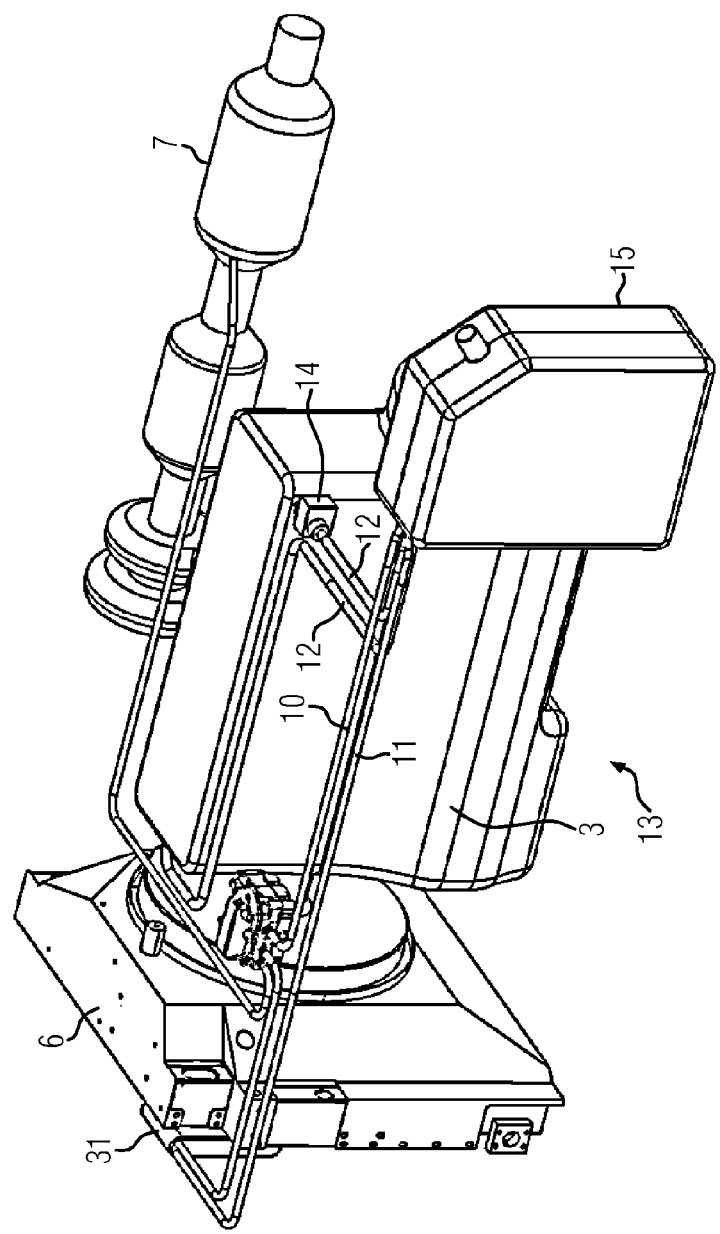
FIG. 10 shows the components of FIG. 5 with a heat management system according to a further embodiment of the disclosure.

In FIG. 10, a similar concept is shown. However, instead of the Peltier element, here a second heat transfer unit 31 is provided which cools the additive in the return line 11. This second heat transfer unit 31 may be arranged in the region of the cooling unit 6 of the primary drive 3, or at any other suitable place at or in the construction machine 1. However, it is just as well possible to provide, instead of the Peltier element 30 or the heat transfer unit 31, one or several arbitrary suitable cooling devices 32 in the region of the return line.

The features of the described embodiments may be combined in any way. Here, the isolated treatment of individual features is also possible. The different described components may in particular be designed structurally such that they may be combined like modules. Thereby, the variety of variants and parts in the production of construction machines 1 according to the disclosure may be reduced. For example, in construction machines 1 which have been ordered to be used in extremely hot regions, all described measures may be installed, while in construction machines 1 for less hot regions, only some selected components may be installed.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A construction machine comprising:
   a tank for receiving an additive for treating exhaust gases of the construction machine, the additive having a decomposition temperature;
   an insulating housing that encloses the tank;
   at least one heat transfer unit associated with the insulating housing and which is configured, together with a compressor, to supply thermal energy to the tank and/or its contents and/or to remove thermal energy from the tank and/or its contents;
   at least one connecting line configured to conduct the additive away from the tank and/or to the tank; and
   a heat management system configured to control temperature of the additive in the tank such that the temperature of the additive does not exceed the decomposition temperature of the additive.

2. The construction machine according to claim 1 wherein the heat management system is configured to control the temperature of the additive in the tank such that the temperature of the additive does not exceed 50° C.

3. The construction machine according to claim 1 wherein the insulating housing comprises channels through which a medium can flow.

4. The construction machine according to claim 1 wherein as a connecting line, at least one return line is provided for supplying the additive to the tank, and in a region of the at least one return line, a cooling device is arranged and configured to withdraw thermal energy from the additive conducted through the at least one return line.

5. The construction machine according to claim 4 wherein the cooling device is a Peltier element.

6. The construction machine according to claim 4 wherein the cooling device is a heat transfer unit which is arranged in a region of a cooling unit of a primary drive of the construction machine.

7. The construction machine according to claim 1 wherein the construction machine is a road finishing machine or a feeder.

8. The construction machine according to claim 1 further comprising a withdrawal unit connected to the at least one connecting line and configured to transport the additive from the tank to the at least one connecting line and/or from the at least one connecting line into the tank.

9. The construction machine according to claim 8 wherein the heat management system comprises control lines connected to the withdrawal unit and configured to supply the withdrawal unit with a heating medium, the withdrawal unit being configured to selectively withdraw and/or supply thermal energy from or to the contents of the tank using the heating medium.

10. The construction machine according to claim 9 wherein the heating medium is a cooling medium of a cooling unit of a primary drive of the construction machine.

11. The construction machine according to claim 9 wherein the control lines are connected to a hot and/or a cold side of a chiller.

12. The construction machine according to claim 11 wherein the heat management system furthermore comprises a control device configured to selectively connect the control lines to the hot or the cold side of the chiller.

13. The construction machine according to claim 11 wherein the chiller is configured to utilize thermal energy of a cooling medium of a primary drive of the construction machine.

14. The construction machine according to claim 11 wherein the chiller is an adsorption chiller.

15. A construction machine comprising:
a tank for receiving an additive for treating exhaust gases of the construction machine, the additive having a decomposition temperature;
at least one connecting line configured to conduct the additive away from the tank and/or to the tank;
a withdrawal unit connected to the at least one connecting line and configured to transport the additive from the tank to the at least one connecting line and/or from the at least one connecting line into the tank; and
a heat management system configured to control temperature of the additive in the tank such that the temperature of the additive does not exceed the decomposition temperature of the additive, the heat management system comprising control lines connected to the withdrawal unit, and a control device configured to selectively connect the control lines to a hot or a cold side of a chiller, the control lines being configured to supply the withdrawal unit with a heating medium;
wherein the withdrawal unit is configured to selectively withdraw and/or supply thermal energy from or to contents of the tank using the heating medium.

16. A construction machine comprising:
a tank for receiving an additive for treating exhaust gases of the construction machine, the additive having a decomposition temperature;
at least one connecting line configured to conduct the additive away from the tank and/or to the tank;
a withdrawal unit connected to the at least one connecting line and configured to transport the additive from the tank to the at least one connecting line and/or from the at least one connecting line into the tank; and
a heat management system configured to control temperature of the additive in the tank such that the temperature of the additive does not exceed the decomposition temperature of the additive, the heat management system comprising control lines connected to the withdrawal unit and to a hot and/or a cold side of an adsorption chiller, the control lines being configured to supply the withdrawal unit with a heating medium;
wherein the withdrawal unit is configured to selectively withdraw and/or supply thermal energy from or to contents of the tank using the heating medium.

* * * * *